U S012337949B2

United States Patent
Hibbs

(10) Patent No.: US 12,337,949 B2
(45) Date of Patent: *Jun. 24, 2025

(54) METHODS AND SYSTEMS FOR RETAINING LATERAL CONTROL OF AN UNMANNED AERIAL VEHICLE DURING LANDING WITH LEVELED INBOARD PROPELLERS

(71) Applicant: AEROVIRONMENT, INC., Arlington, VA (US)

(72) Inventor: Bart Dean Hibbs, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,840

(22) Filed: Jun. 22, 2023

(65) Prior Publication Data

US 2023/0331373 A1    Oct. 19, 2023

Related U.S. Application Data

(63) Continuation of application No. 17/684,019, filed on Mar. 1, 2022, now Pat. No. 11,724,793, which is a
(Continued)

(51) Int. Cl.
*B64C 11/46*      (2006.01)
*B64C 3/14*       (2006.01)
(Continued)

(52) U.S. Cl.
CPC ............... *B64C 11/46* (2013.01); *B64C 3/14* (2013.01); *B64C 3/32* (2013.01); *B64C 3/42* (2013.01);
(Continued)

(58) Field of Classification Search
CPC ........... B64C 11/46; B64C 3/32; B64U 50/19; B64U 10/25; B64U 40/10; B64U 40/20; G05D 1/439
See application file for complete search history.

(56) References Cited

U.S. PATENT DOCUMENTS 5,702,071 A    12/1997    Kroll et al.
5,810,284 A    9/1998    Hibbs et al.
(Continued)

FOREIGN PATENT DOCUMENTS

EP    3401215 A1    11/2018
JP    6578451 B2    9/2019
JP    2020015396 A    1/2020

OTHER PUBLICATIONS

International Search Report and Written Opinion for PCT/US2020/063640, mailed Mar. 8, 2021.

*Primary Examiner* — Philip J Bonzell
(74) *Attorney, Agent, or Firm* — Command IP LLP; Pejman Yedidsion; Eric Aagaard

(57) ABSTRACT

Systems, devices, and methods including an unmanned aerial vehicle (UAV); one or more inner wing panels of the UAV; one or more outer wing panels of the UAV; at least one inboard propeller attached to at least one engine disposed on the one or more inner wing panels; at least one tip propeller attached to at least one engine disposed on the one or more outer wing panels; at least one microcontroller configured to: determine an angular position of the at least one inboard propeller; and send a signal to halt rotation of the at least one inboard propeller such that the at least one inboard propeller is held in an attitude that provides for clearance of the propeller blade to the ground upon landing.

20 Claims, 8 Drawing Sheets

Related U.S. Application Data continuation of application No. 17/298,499, filed as application No. PCT/US2020/063640 on Dec. 7, 2020, now Pat. No. 11,292,583.

(60) Provisional application No. 62/945,815, filed on Dec. 9, 2019.

(51) Int. Cl.
| | | |
|---|---|---|
| *B64C 3/32* | (2006.01) | |
| *B64C 3/42* | (2006.01) | |
| *B64C 39/08* | (2006.01) | |
| *B64U 10/25* | (2023.01) | |
| *B64U 30/10* | (2023.01) | |
| *B64U 50/13* | (2023.01) | |
| *B64U 50/19* | (2023.01) | |
| *B64U 70/90* | (2023.01) | |

(52) U.S. Cl.
CPC .............. *B64C 39/08* (2013.01); *B64U 10/25* (2023.01); *B64U 30/10* (2023.01); *B64U 50/13* (2023.01); *B64U 50/19* (2023.01); *B64U 70/90* (2023.01)

(56) References Cited

U.S. PATENT DOCUMENTS

| | | |
|---|---|---|
| 10,526,069 B1 | 1/2020 | Rahrig |
| 10,814,959 B2 | 10/2020 | Cheung |
| 2015/0008857 A1 | 1/2015 | Firanski et al. |
| 2016/0144969 A1 | 5/2016 | Rawdon et al. |
| 2018/0093754 A1 | 4/2018 | Cheung |
| 2018/0273170 A1 | 9/2018 | D'Sa et al. |
| 2019/0077497 A1 | 3/2019 | Uhlig et al. |
| 2021/0064063 A1 | 3/2021 | Wakikawa |
| 2021/0065562 A1 | 3/2021 | Tajika |

METHODS AND SYSTEMS FOR RETAINING LATERAL CONTROL OF AN UNMANNED AERIAL VEHICLE DURING LANDING WITH LEVELED INBOARD PROPELLERS

CROSS-REFERENCE TO RELATED APPLICATIONS

This application is a continuation of U.S. Non-Provisional patent application Ser. No. 17/684,019, filed Mar. 1, 2022, which is a continuation of U.S. Non-Provisional patent application Ser. No. 17/298,499, filed May 28, 2021, which issued as U.S. Pat. No. 11,292,583 on Apr. 5, 2022, which is a 35 U.S.C § 371 National Stage Entry of International Application No. PCT/US2020/063640 filed Dec. 7, 2020, which claims priority to and the benefit of U.S. Provisional Patent Application No. 62/945,815, filed Dec. 9, 2019, the contents of which are hereby incorporated by reference herein for all purposes.

TECHNICAL FIELD

Embodiments relate generally to unmanned aerial vehicles (UAVs), and more particularly to retaining lateral control of a UAV during landing with leveled inboard propellers.

BACKGROUND

Unmanned aerial vehicles (UAVs), such as a high altitude long endurance aircraft, are lightweight planes that are capable of controlled, sustained flight. UAVs may be associated with ground-based operators for two-way communications.

SUMMARY

An embodiment may include a system for retaining lateral control of an unmanned aerial vehicle (UAV) during take-off and landing with leveled inboard propellers. In one embodiment, the UAV is a high altitude long endurance solar-powered aircraft.

A system embodiment may include: an unmanned aerial vehicle (UAV); one or more inner wing panels of the UAV; one or more outer wing panels of the UAV, where the one or more outer wing panels are disposed on either side of the one or more inner wing panels, and where the one or more outer wing panels are disposed at an upward angle to a plane formed by the one or more inner wing panels; at least one inboard propeller attached to at least one engine disposed on the one or more inner wing panels; at least one tip propeller attached to at least one engine disposed on the one or more outer wing panels; at least one microcontroller in communication with the at least one engine disposed on the one or more inner wing panels, where the at least one microcontroller may be configured to: determine an angular position of the at least one inboard propeller; and send a signal to halt rotation of the at least one inboard propeller such that the at least one inboard propeller may be held in an attitude that will provide for ground clearance of the propeller blade upon landing.

In additional system embodiments, the UAV may be a high altitude long endurance aircraft. In additional system embodiments, a solar array may cover at least a portion of the one or more inner wing panels and the one or more outer wing panels. Additional system embodiments may include: one or more landing pods of the UAV, where the one or more landing pods may be attached to the one or more inner wing panels of the UAV to assist in landing of the UAV. In additional system embodiments, a distance ($d_1$) from a center of a propeller hub to a tip of the at least one inboard propeller may be greater than a height of the one or more landing pods, and where the at least one inboard propeller would strike a ground during rotation of the at least one inboard propeller when the UAV is on the ground. In additional system embodiments, the at least one outboard propeller may be identical to the at least one inboard propeller, and where the at least one outboard propeller can freely rotation when the UAV is on the ground.

Additional system embodiments may include: a position sensor in communication with the microcontroller, where the position sensor detects a position of the at least one inboard propeller. In additional system embodiments, the position sensor may be a Hall-Effect rotary position sensor. In additional system embodiments, the at least one microcontroller may be further configured to: determine an altitude of the UAV; and send the signal to halt rotation of the at least one inboard propeller if the determined altitude is below a threshold altitude. In additional system embodiments, the at least one microcontroller may be further configured to: send a signal to adjust rotation of the at least one outboard propeller while the at least one inboard propeller is held in an attitude that provides for ground clearance of the propeller blade. In additional system embodiments, the at least one microcontroller may be further configured to: determine an altitude of the UAV; and send a signal to start rotation of the at least one inboard propeller if the determined altitude is above a threshold altitude.

A method embodiment may include: determining, by at least one microcontroller, an altitude of an unmanned aerial vehicle (UAV); determining, by the at least one microcontroller in communication with at least one engine of a UAV, an angular position of the at least one inboard propeller connected to the at least one engine, where the at least one inboard propeller is disposed on one or more inner wing panels; sending, by the at least one microcontroller, a signal to halt rotation of the at least one inboard propeller such that the at least one inboard propeller is held in an attitude that provides for ground clearance of the propeller blade if the determined altitude is below a threshold altitude; and where the at least one inboard propeller would strike a ground during rotation of the at least one inboard propeller when the UAV is on the ground.

Additional method embodiments may include: sending, by the at least one microcontroller, a signal to adjust rotation of at least one outboard propeller connected to at least one engine while the at least one inboard propeller is held in an attitude that provides for clearance of the propeller blade and the ground upon landing where the at least one outboard propeller is disposed on one or more outer wing panels. In additional method embodiments, the at least one outboard propeller is identical to the at least one inboard propeller, and where the at least one outboard propeller can freely rotate when the UAV is on the ground.

Another system embodiment may include: an unmanned aerial vehicle (UAV); at least one inboard propeller attached to at least one engine of the UAV, where at least a portion of the at least one inboard propeller would contact a surface during rotation of the at least one inboard propeller when the UAV is located on the surface; at least one tip propeller attached to at least one engine of the UAV, where the at least one tip propeller can rotate freely without contacting the surface during rotation of the at least one tip propeller when the UAV is located on the surface; at least one microcontroller in communication with the at least one engine, where the at least one microcontroller is configured to: determine an angular position of the at least one inboard propeller; and send a signal to the at least one inboard propeller such that the at least one inboard propeller is held in an attitude that provides for clearance of the propeller blade and the surface.

In additional system embodiments, the at least one microcontroller is further configured to: send a signal to the at least one tip propeller to adjust a thrust to guide the UAV in for landing while the at least one inboard propeller is held in an attitude that provides for ground clearance of the propeller blade, where the at least one tip propeller retains lateral control of the UAV during landing. In additional system embodiments, the at least one microcontroller is further configured to: send a signal to the at least one tip propeller to adjust a thrust to guide the UAV for take-off while the at least one inboard propeller is held in an attitude that provides for ground clearance of the propeller blade, where the at least one tip propeller retains lateral control of the UAV during take-off; and send a signal to the at least one inboard propeller after take-off such that the at least one inboard propeller starts rotation.

Additional system embodiments may further include: one or more landing pods to assist in the safe landing of the UAV at the surface, where a distance ($d_1$) from a center of a propeller hub to a tip of the at least one inboard propeller is greater than a height ($d_2$) of the one or more landing pods, and where the distance ($d_1$) from the center of the propeller hub to the tip of the at least one tip propeller is greater than or equal to a height ($d_3$) from the center of the propeller hub of the at least one tip propeller to a bottom of the one or more landing pods. Additional system embodiments may further include: one or more inner wing panels of the UAV, where the at least one inboard propeller is attached to the one or more inner wing panels; and one or more outer wing panels of the UAV, where the at least one tip propeller is attached to the one or more outer wing panels, where the one or more outer wing panels are disposed on either side of the one or more inner wing panels, and where the one or more outer wing panels are disposed at an upward angle to a plane formed by the one or more inner wing panels. Additional system embodiments may further include: a position sensor in communication with the microcontroller, where the position sensor detects a position of the at least one inboard propeller.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
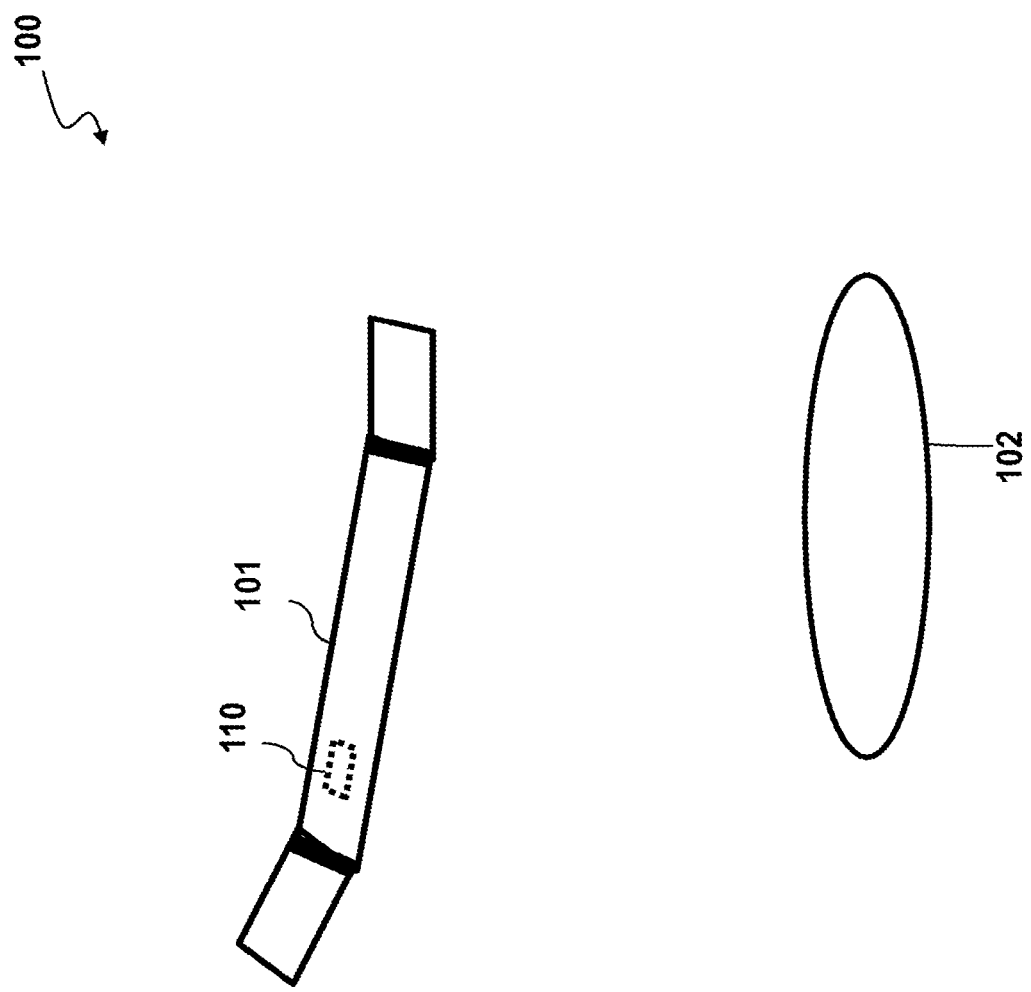
FIG. 1 depicts a system for retaining lateral control of an unmanned aerial vehicle during landing with leveled inboard propellers, according to one embodiment.

With respect to FIG. 1, a system 100 for retaining lateral control of an unmanned aerial vehicle (UAV) 101 during landing with leveled inboard propellers is depicted. UAVs are aircraft with no onboard pilot and may fly autonomously or remotely. Large UAVs may use landing pods for a safe landing, which may provide extra weight and drag. UAVs may use differential thrust from the UAV's propulsion system for lateral control in some flight regimes, including take-off and landing. In one embodiment, the UAV 101 is a high altitude long endurance aircraft. In one embodiment, the UAV 101 may have three or more motors, for example, between three and forty motors, and a wingspan between 100 feet and 400 feet. In one embodiment, the UAV 101 has a wingspan of approximately 260 feet and is propelled by a plurality of motors, for example, ten electric motors, powered by a solar array covering the surface of the wing, resulting in zero emissions. Flying at an altitude of approximately 65,000 feet above sea level and above the clouds, the UAV 101 is designed for continuous, extended missions of up to months without landing.

The UAV 101 functions optimally at high altitudes and is capable of considerable periods of sustained flight without recourse to land. In one embodiment, the UAV 101 may weigh approximately 3,000 lbs.

The UAV 101 further includes at least one motor 110 coupled to the UAV 101 for the propulsion of the UAV 101. In one embodiment, the motor 110 is a brushless DC motor in a conventional configuration that includes an in-runner rotor electrically connected with a wye-configuration winding about improved armatures. The motor 110 may have a casing formed of steel or other high-strength material to enclose and protect the motor. A stator is positioned around the perimeter of a rotor, with the stator having a back iron to contain the magnetic field of the stator. The rotor may be formed of permanent magnets such as neodymium and praseodymium or suitable magnet, including electromagnets. The stator may have armatures built up from layers of laminated electrical steel, such as silicon steel, with an oxide film positioned between each steel layer, to reduce induced ring currents and to increase the efficiency of the motor 110. Other armature materials may include iron or amorphous steel.

In one embodiment, the motor 110 is configured to have windings wound around iron teeth. Additionally, there may be a layer of magnets on the outside of the motor 110 that may remain glued to the motor 110 down to approximately −80° Celsius. This is advantageous as the UAV 108 often flies at night and at high altitude with temperatures approaching −80° Celsius.

Some motors in the art may be ironless to avoid hysteresis losses and eddy current losses, which result in energy being wasted in the form of heat. In one embodiment, the motor 110 may incorporate permendur: a cobalt-iron soft magnetic alloy with equal parts iron and cobalt, such as Hiperco®. Permendur has very low hysteresis and eddy current losses, often performing better than ironless motors. Still further, iron has some very important properties that are not found in ironless motors, including; (1) mechanically supporting the winding, (2) providing inductance, thus not requiring external inductors, (3) providing a way for heat to get out of the motor, (4) gives a very thin air gap so you need far less magnetic material to make the magnetic field, and (5) keeping the magnetic field out of copper, because a magnetic field going through copper causes large energy losses in copper.

Figure 2:
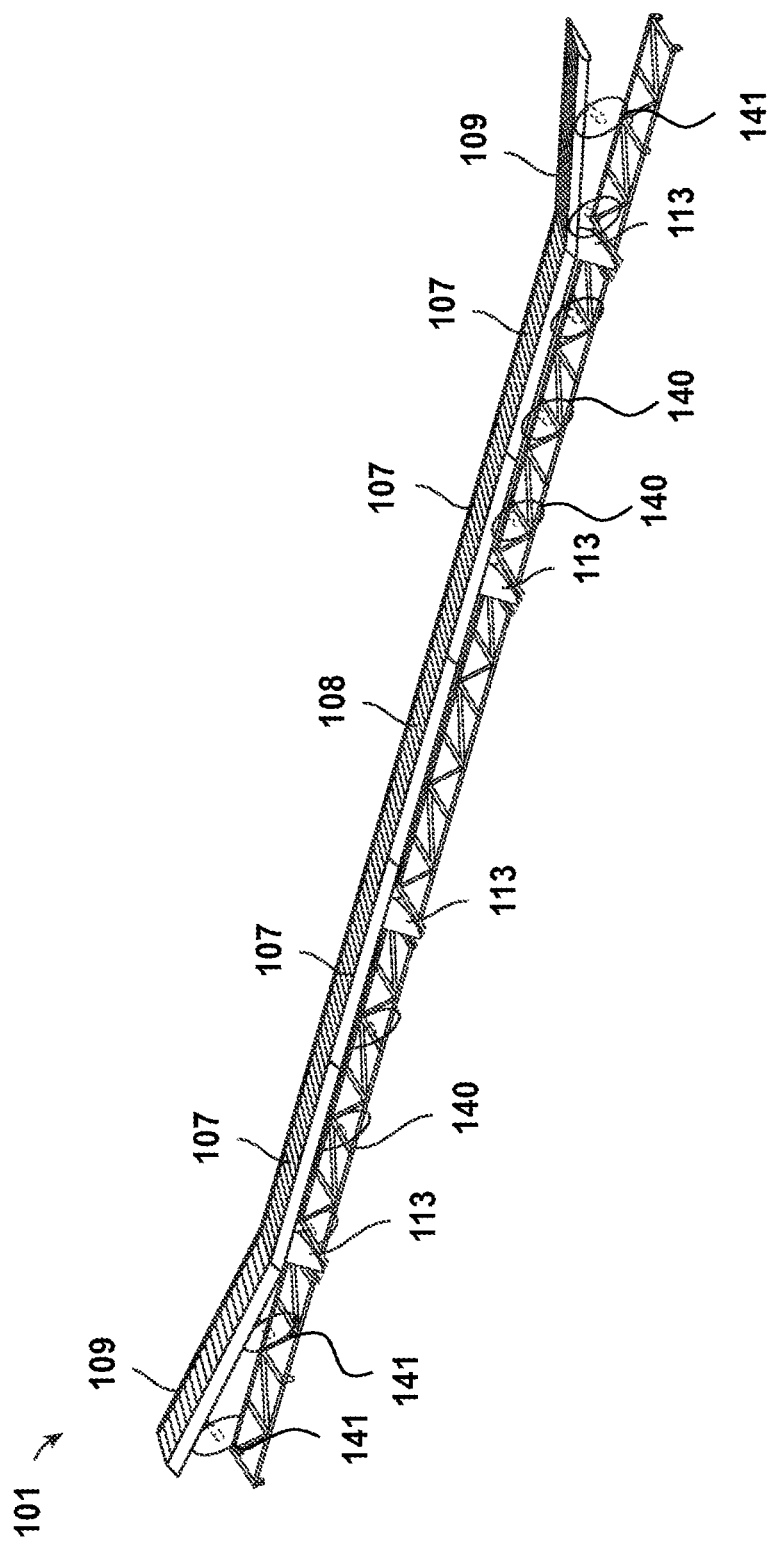
FIG. 2 depicts a top perspective view of the unmanned aerial vehicle of FIG. 1.

With respect to FIG. 2, the UAV 101 may include one or more inner wing panels 107 and one or more outer wing panels 109, a center panel 108, a plurality of inboard propellers 140 associated with respective inner wing panels 107, and a plurality of tip propellers 141 associated with respective outer wing panels 109. The UAV 101 may further include one or more landing pods 113 to assist in the safe landing of the UAV 101 at a landing site (102, FIG. 1). The one or more inner wing panels 107 may be disposed on either side of a center panel 108. In some embodiments, there may be no center panel 108 and only inner wing panels 107 may be used. In other embodiments, the inner wing panels 107 may be identical to the center panel 107. The one or more outer wing panels 109 may be disposed on either side of the one or more inner wing panels 107 and/or center panel 108. The one or more outer wing panels 109 may be disposed at an angle to a plane formed by the one or more inner wing panels 107 and/or center panel 108. In some embodiments, the one or more outer wing panels 109 may curve upwards relative to a plane formed by the one or more inner wing panels 107 and/or center panel 108. In one embodiment, the UAV 101 has a wingspan of approximately 260 feet and is propelled by a plurality of motors, for example, 10 electric motors, powered by a solar array covering the surface of each wing, resulting in zero emissions.

Figure 3A:
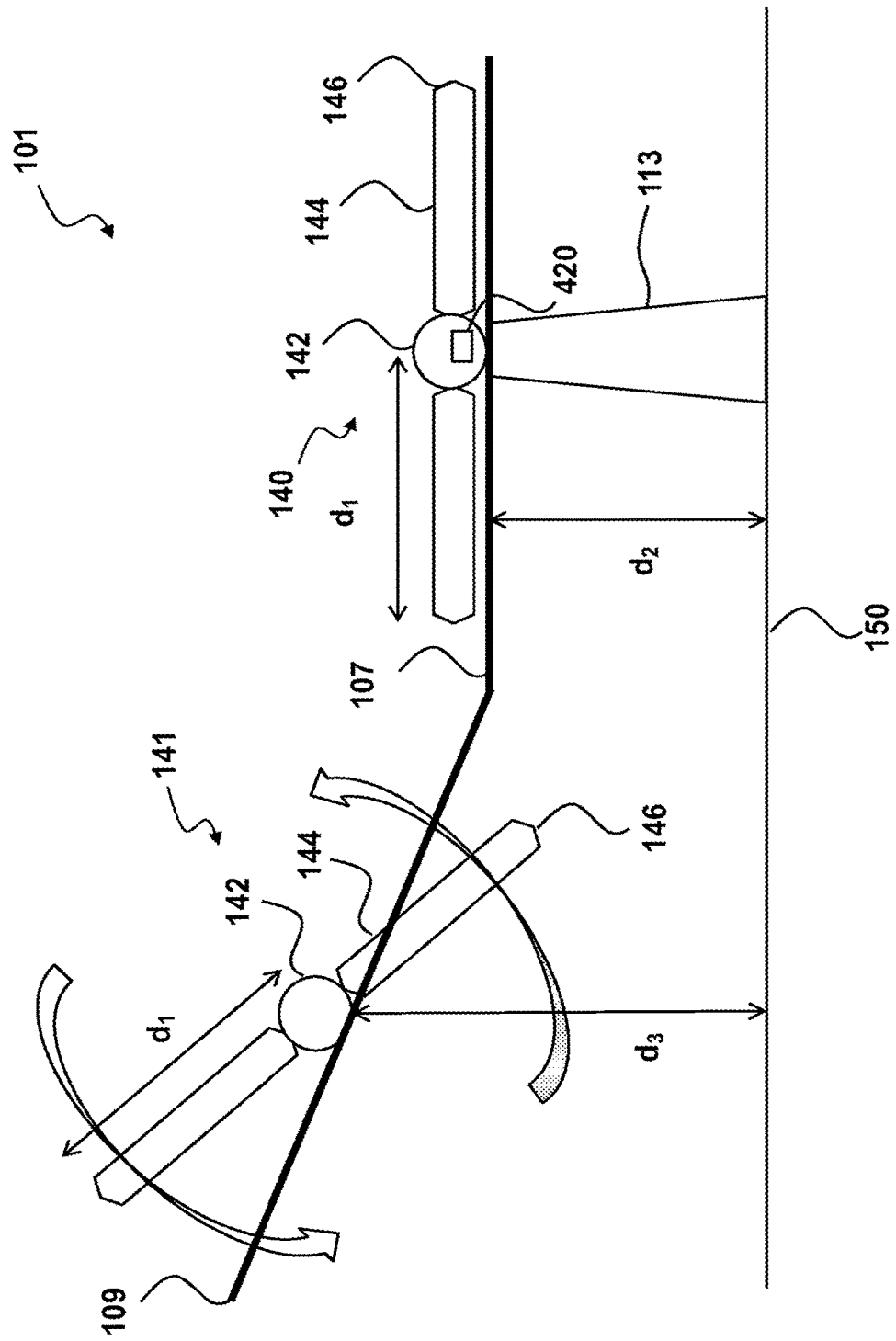
FIG. 3A depicts a schematic of wing panels and associated propellers of the unmanned aerial vehicle of FIG. 1.

With respect to FIG. 3A, the inboard propellers 140 of the one or more inner wing panels 107 of the UAV 101 and the tip propellers 141 of the one or more outer wing panels 109 of the UAV 101 may each include a propeller hub 142, propeller blades 144, and propeller blade tips 146. In one embodiment, the propellers 140,141 may each have two blades 144. In another embodiment, the propellers 140,141 may each have more than two blades 144. In one embodiment, the propellers 140,141 may be identical. In one embodiment, the center of the propeller hub 142 to the propeller blade tip 146 has a distance, $d_1$. With respect to the inner wing panel 107, the landing pod 113 proximate the associated propeller hub 142 has a height, $d_2$.

Generally speaking, it may be desired to decrease the height of the landing pods 113 in order to decrease the weight of the landing pods 113 and the drag induced by the landing pods 113 on the UAV 101. However, decreasing the height of the landing pods 113 may be limited by the distance $d_1$. For example, if the height of the landing pods 113 $d_2$ is too short, such that the distance from the center of the propeller hub 142 to the propeller blade tip 146 is greater than or equal to the height $d_2$ of the landing pod (e.g., $d_1 \leq d_2$), then the blade 144 may strike a surface 150, such as the ground as the inboard propeller 140 rotates when the UAV 101 is on the ground 150 or near the ground 150, such as during take-off and landing, thus causing damage to the UAV 101.

In one embodiment, the inboard propellers 140 may be leveled, such that the blades 144 may be in an attitude that provides for clearance of the propeller blade to the ground 150 upon the landing of the UAV 101. In some embodiments, the attitude that provides for clearance of the propeller blade to the ground 150 is where the blades of a two-blade propeller are maintained substantially parallel to a plane formed by the one or more inner wing panels. In other embodiments, the attitude that provides for clearance of the propeller blade to the ground 150 is where the blades of a two-blade propeller are maintained at an angle relative to a plane formed by the one or more inner wing panels such that the propeller blades do not contact the ground 150, such as at an angle to the plane and/or not substantially perpendicular to the plane. In some embodiments, the attitude that provides for clearance of the propeller blade to the ground 150 is where the blades of a three-blade propeller are maintained such that any blade of the propeller does not contact the ground 150 and/or a topmost propeller blade may be substantially perpendicular to the plane. In one embodiment, the inboard propellers 140 and the tip propellers 141 may each include a microcontroller 420. Each microcontroller 420 may be in communication with the respective motor for each propeller 140, 141. In some embodiments, one microcontroller 420 may control one or more propellers, such as all of the inboard propellers 140. In one embodiment, each propeller 140, 141 has an associated microcontroller 420. In another embodiment, a single microcontroller 420 controls all of the propellers 140, 141. In another embodiment, one microcontroller 420 controls the tip propellers 141 and another microcontroller 420 controls the inboard propellers 140.

As described below, the tip propellers 141 may be allowed to continue to function for propulsion and control purposes during landing and take-off. More specifically, the landing pods 113 may be tall enough such that a distance di from the center of the propeller hub 142 to the propeller blade tip 146 is greater than or equal to the height $d_3$ from the center of the propeller hub 142 to the bottom of the landing pod 113 (e.g., $d_1 \leq d_3$).

Figure 3B:
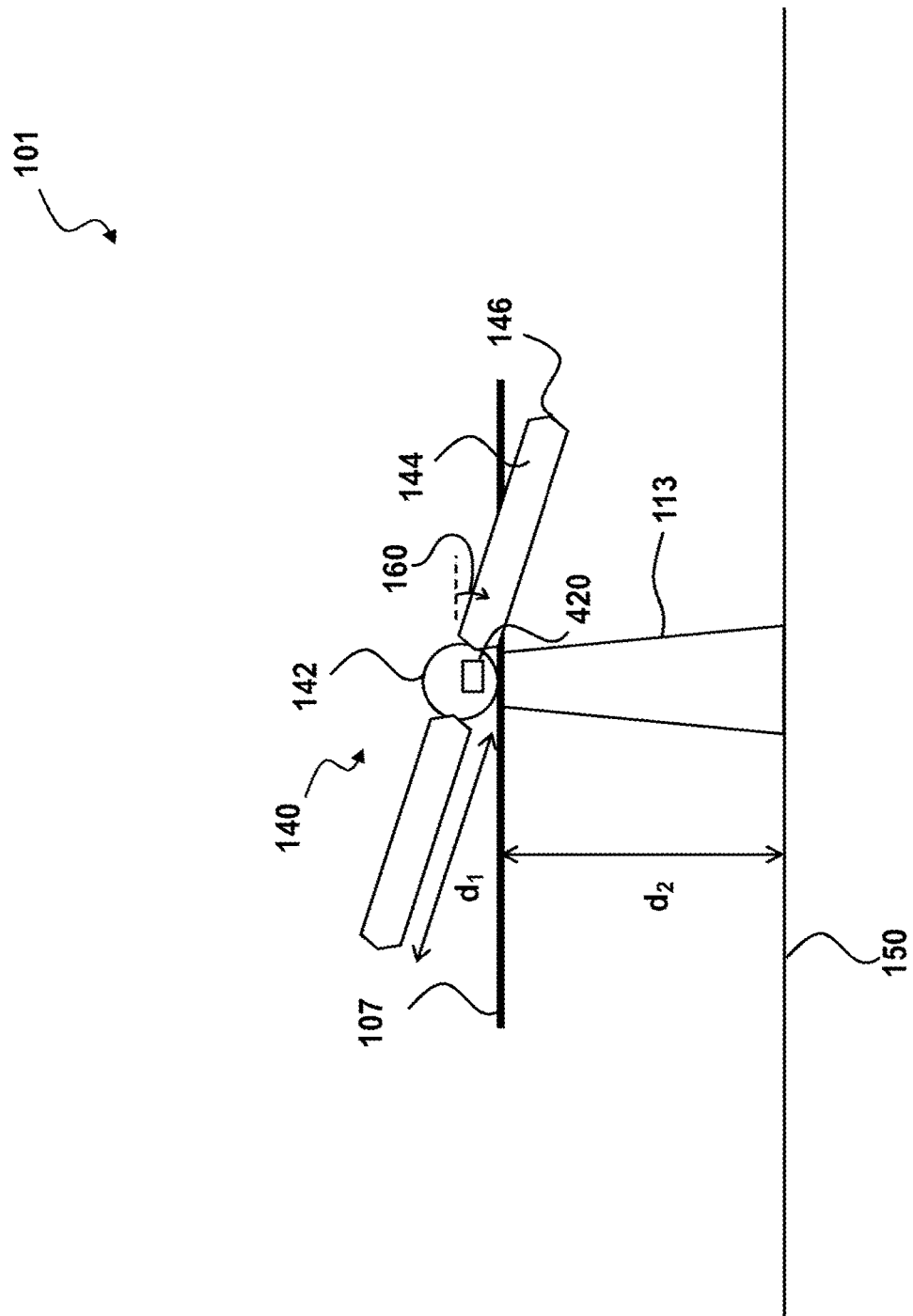
FIG. 3B depicts a schematic of a wing panel and a two-blade propeller being held relative to the wing panel.

FIG. 3B depicts a schematic of a wing panel 107 and a two-blade propeller 140 being held relative to the wing panel 107. The inboard propellers 140 may each include a propeller hub 142, propeller blades 144, and propeller blade tips 146. In one embodiment, the center of the propeller hub 142 to the propeller blade tip 146 has a distance, $d_1$. With respect to the inner wing panel 107, the landing pod 113 proximate the associated propeller hub 142 has a height, $d_2$.

In one embodiment, the inboard propellers 140 may be maintained at an attitude that provides for clearance of the propeller blade to the ground 150. The blades of the two-blade propeller 140 may be maintained at an angle 160 relative to a plane formed by the one or more inner wing panels 107 such that the propeller blades 144 do not contact the ground 150, such as at an angle 160 to the plane and/or not substantially perpendicular to the plane.

Figure 3C:
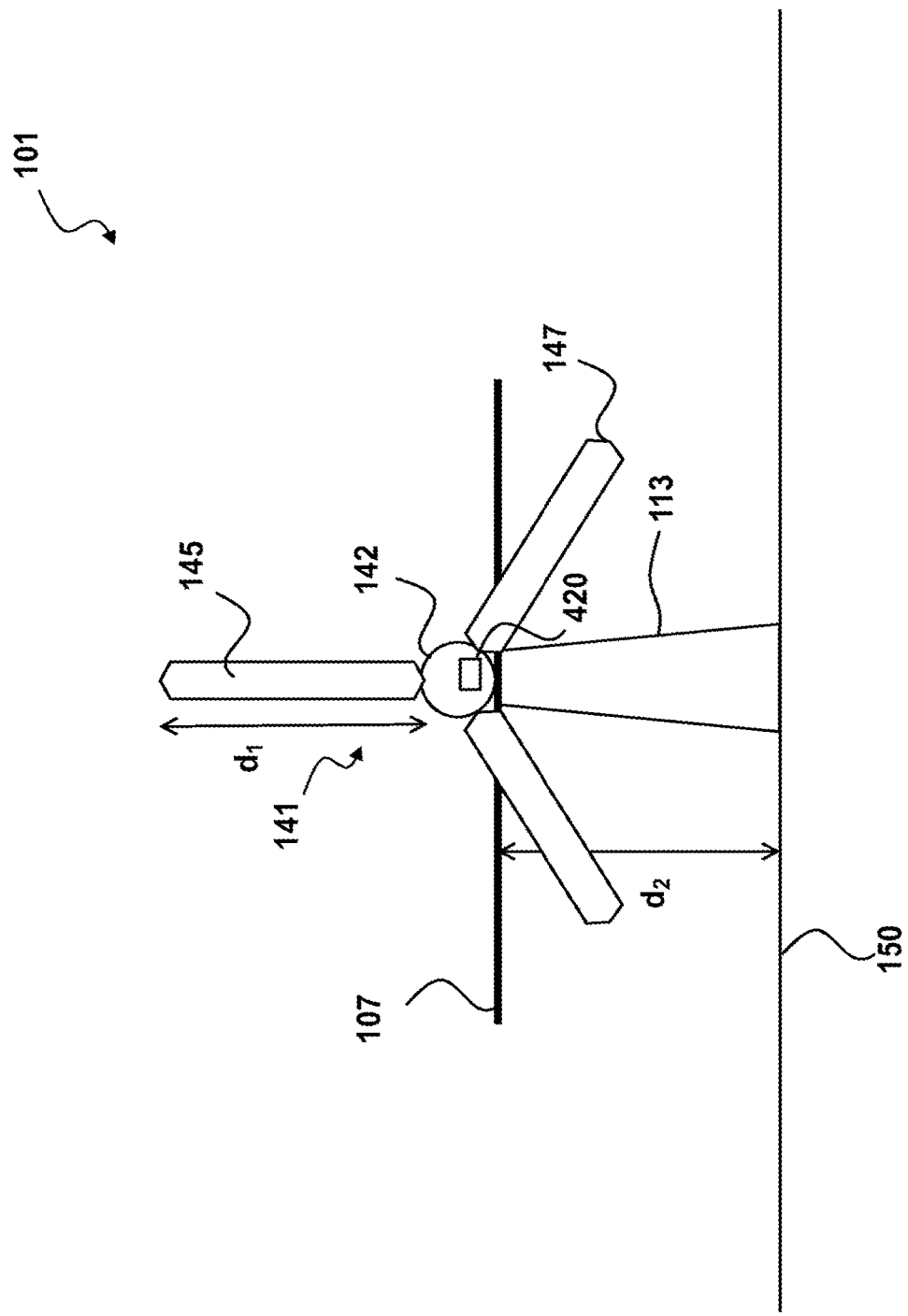
FIG. 3C depicts a schematic of a wing panel and a three-blade propeller being held relative to the wing panel.

FIG. 3C depicts a schematic of a wing panel 107 and a three-blade propeller 141 being held relative to the wing panel. The inboard propellers 141 may each include a propeller hub 142, propeller blades 145, and propeller blade tips 147. In one embodiment, the center of the propeller hub 142 to the propeller blade tip 147 has a distance, $d_1$. With respect to the inner wing panel 107, the landing pod 113 proximate the associated propeller hub 142 has a height, $d_2$.

In one embodiment, the inboard propellers 141 may be maintained at an attitude that provides for clearance of each propeller blade 145 to the ground 150. The blades of the three-blade propeller 145 may be maintained at an angle relative to a plane formed by the one or more inner wing panels 107 such that the propeller blades 145 do not contact the ground 150. In one embodiment, a top propeller blade (i.e., a propeller blade 145 of the three-blade propeller 145 having a propeller blade tip 147 furthest from the ground 150) may be substantially perpendicular to a plane formed by the inner wing panel 107. In other embodiments, the top propeller blade may be held at an angle relative to substantially perpendicular to the plane formed by the inner wing panel 107. The positioning of the three-blade propeller 141 relative to the inner wing panel 107 may be such so as to provide for clearance of each propeller blade 145 to the ground.

Figure 4:
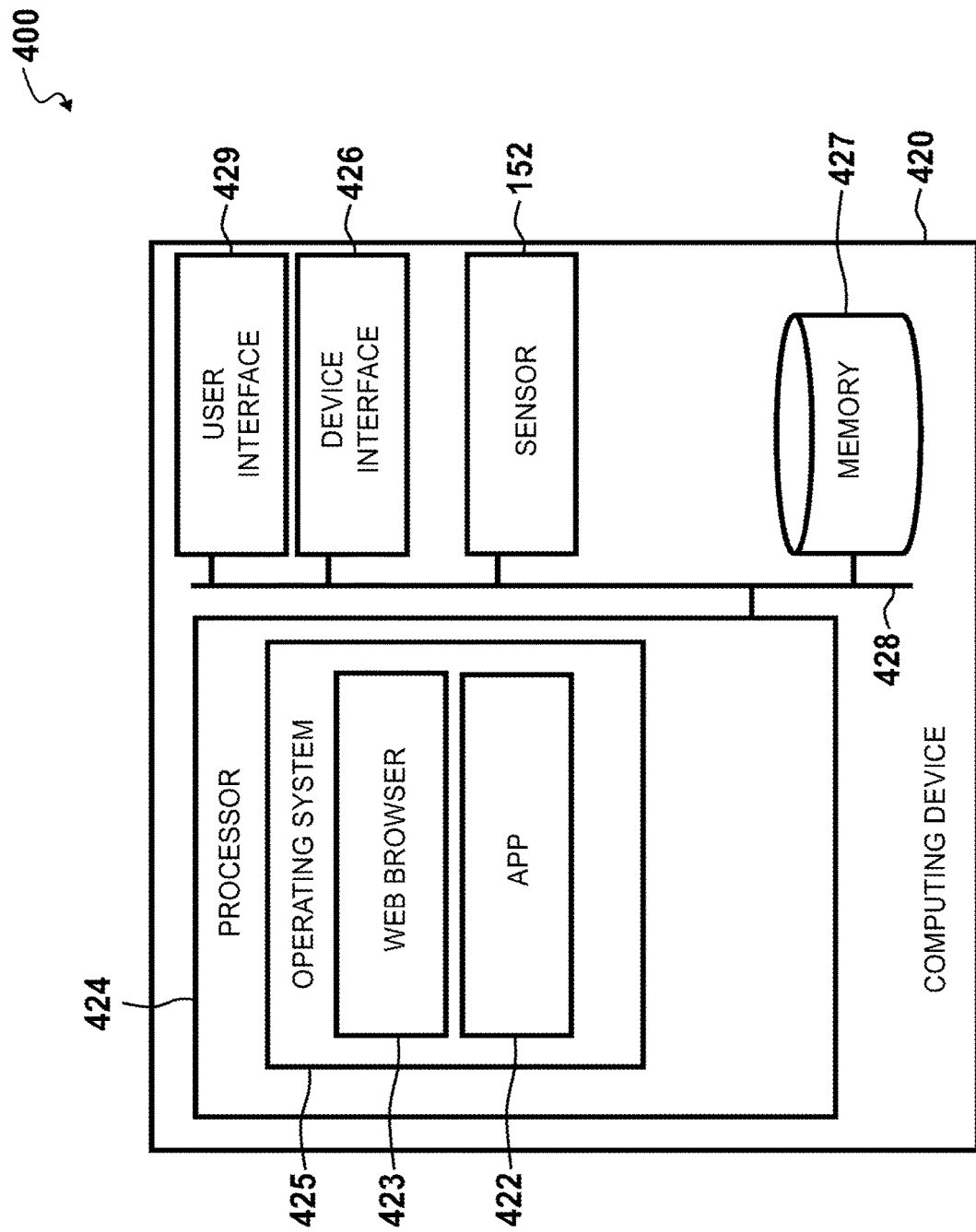
FIG. 4 illustrates an example top-level functional block diagram of a computing device embodiment.

FIG. 4 illustrates an example of a top-level functional block diagram of a computing device embodiment 400. The example operating environment is shown as a computing device, such as microcontroller 420 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may include any type of computer-readable media that can store data accessible by the microcontroller 420, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above.

The microcontroller 420 may further include at least one sensor 152, such as an external angular position sensor. In one embodiment, the sensor 152 may be a magnetic rotary position sensor, such as a Hall-Effect rotary position sensor. In another embodiment, the sensor 152 is a variable reluctance sensor. In another embodiment, the sensor 152 may be an optical sensor. In another embodiment, the sensor 152 may be a combination of a magnetic sensor and an optical sensor. In one embodiment, the combination magnetic-optical sensor may detect the current position of the blades 144, rather than solely a detection of a signal of the blades 144 at a particular position, such as a leveled position.

With respect to the magnetic Hall-effect sensor embodiment, a magnet may be mounted to each blade 144 and the magnet hall-effect sensor 152 may detect each magnet. Therefore, the sensor 152 may detect the angular position of the blades 144 and the processor 424 may execute steps to continually control the angular position of the blades 144 mounted to the motor 110. More specifically, as the UAV 101 descends below a threshold altitude as the UAV 101 approaches the ground 150 for landing, a flight control computer (FCC) may send a command signal to each motor 110 associated with an inner wing panel 107 to level, hold, and lock the blades 144 of the associated one or more inboard propellers 140. The microcontroller 420 in turn will control the motor 110 speed, thereby leveling, holding, and locking the blades 144. Furthermore, microcontrollers 420 associated with the tip propellers 141 may control the motor 110 speed for landing and take-off, while the blades 144 associated with the inboard propellers 140 are leveled and locked.

When the rotation of the inboard propellers 140 is halted, such as when the UAV 101 descends to the landing site 102, the tip propellers 141 may continue to rotate and the thrust from the motors 110 to the tip propellers 141 may allow the tip propellers 141 to guide the UAV 101 in for a landing. On or near the ground 150, the distance $d_1$ is greater than a distance $d_3$ from the propeller hub 142 to the ground 150. This is due to the upturn of the outer wing 109 providing a safe distance between the tip propellers 141 and the ground 150 at all times. Configured as such, the unleveled tip propellers 141 retain lateral control of the UAV 101 during landing, while the inboard propellers 140 are held in a leveled position.

During take-off of the UAV 101, the inboard propellers 140 may initially be oriented in an attitude that provides for clearance of the propeller blade to the ground 105, while the tip propellers 141 may provide both control functions and sufficient thrust to allow the UAV 101 to take-off and climb above a threshold altitude. The inboard propellers 140 may then be used for additional propulsion when the UAV 101 has ascended above the threshold altitude.

Figure 5:
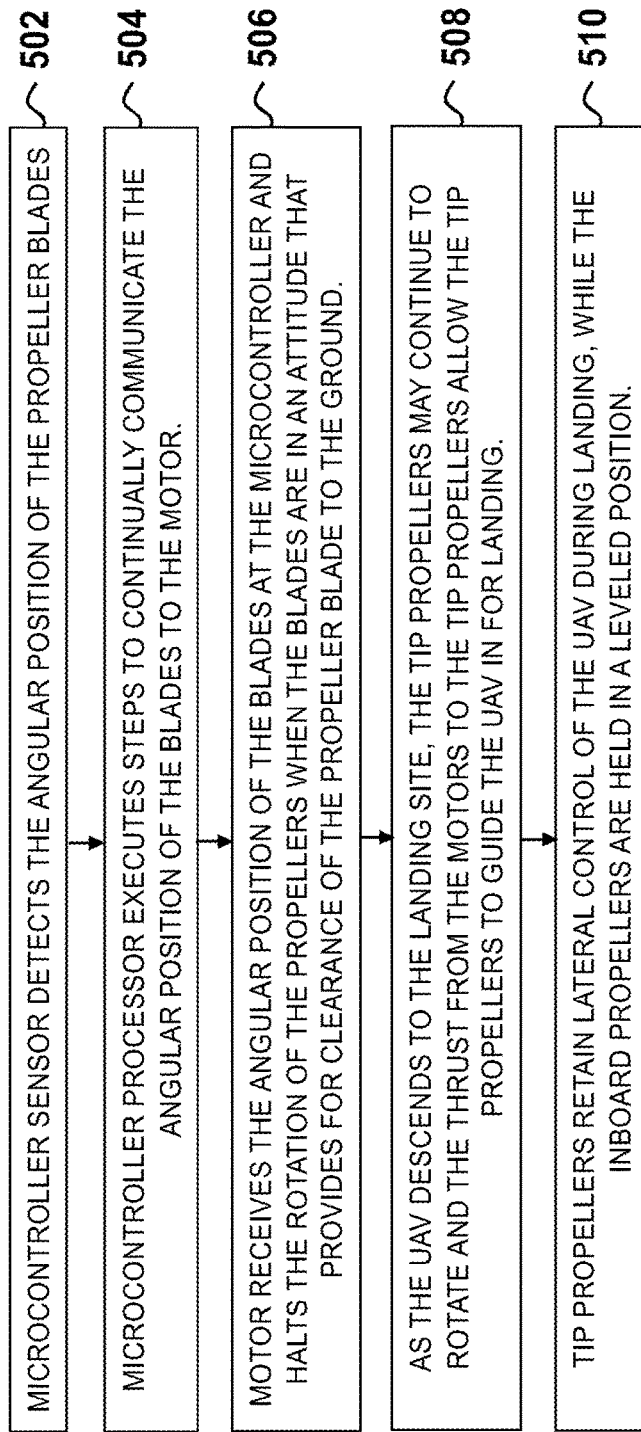
FIG. 5 illustrates a flowchart of the steps executed by the microcontroller for landing of the UAV.

With respect to FIG. 5, a flowchart 500 of the steps executed by a microcontroller, such as a microcontroller 420 for landing of a UAV, such as UAV 101 is illustrated. At step 502, a sensor may detect the angular position of the blades of a propeller of the UAV. At step 504, a processor of the microcontroller may execute steps to continually control the angular position of the blades mounted to a motor. In one embodiment, each propeller (either tip propellers or inboard propellers) has an associated microcontroller. In another embodiment, a single microcontroller controls all of the propellers. In another embodiment, one microcontroller controls the tip propellers and another microcontroller controls the inboard propellers. In one embodiment, the UAV has a wingspan of approximately 260 feet and is propelled by a plurality of motors, for example, ten electric motors, powered by a solar array covering the surface of each wing, resulting in zero emissions.

As the UAV descends below a threshold altitude as the UAV approaches the ground for landing, a flight control computer (FCC) may send a command signal to each motor associated with an inner wing panel of the UAV to level the blades of the associated propeller. At step 506, the motor in turn will receive the angular position of the blades and halt the rotation of the propellers in an attitude that provides for clearance of the propeller blade to the ground upon landing.

At step 508, when the rotation of the propellers is halted as the UAV descends to a landing site, the tip propellers may continue to rotate and the thrust from the motors to the tip propellers may allow the tip propellers to guide the UAV in for a landing. In one embodiment, the center of a propeller hub to a propeller blade tip has a distance, $d_1$. With respect to the inner wing panel, a landing pod 113 proximate to the associated propeller hub has a height, $d_2$. The landing pods may be tall enough such that a distance $d_3$ from the center of the propeller hub to the propeller blade tip is greater than or equal to the height $d_2$ of the landing pod (e.g., $d_1 \leq d_3$). On or near the ground, the distance $d_1$ is greater than a distance $d_3$ from the propeller hub 142 to the ground. This is due to the upturn of an outer wing providing a safe distance between the tip propellers and the ground at all times. Configured as such, and at step 510, the unleveled tip propellers retain lateral control of the UAV during landing, while the propellers are held in a leveled position. In some embodiments, a signal may be sent to the tip propellers to adjust rotation, such as by increasing rotation, decreasing rotation, or maintaining a present rotation. When the inner propellers are held, increase the speed of the tip propellers could be done if it desired to maintain the same thrust. In some embodiments, the rotation of the tip propellers may be increased, left the same, or decreased as needed for control.

Figure 6:
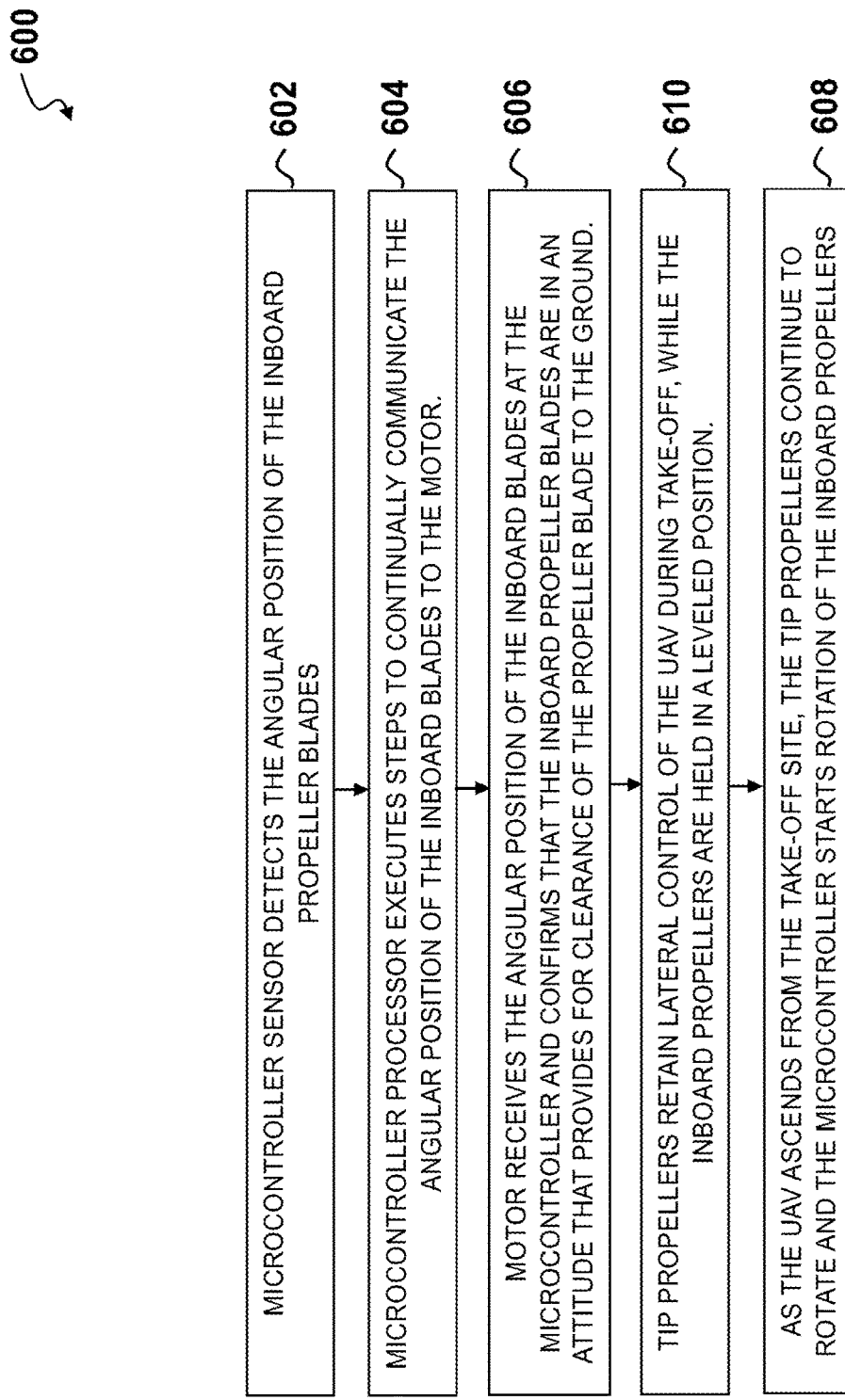
FIG. 6 illustrates a flowchart of the steps executed by the microcontroller for take-off of the UAV.

With respect to FIG. 6, a flowchart 600 of the steps executed by a microcontroller, such as a microcontroller 420 for take-off of a UAV, such as UAV 101 is illustrated. The method 600 may include detecting, by a sensor in communication with the microcontroller, an angular position of the inboard propeller blades (step 602). The method 600 my then include the microcontroller processor executing steps to continually communicate the angular position of the inboard blades to the motor (step 604). The method 600 may then include the motor receiving the angular position of the inboard blades at the microcontroller and the microcontroller processor may confirm that the inboard propeller blades are in the proper attitude (step 606). If the inboard propeller blades are not in the proper attitude during rotation, i.e., if they are not held in place, then there is a risk that the rotating inboard propeller blade could strike the ground during take-off. If the inboard propeller blades are not in the proper attitude to the inner wing panel, then the processor of the microcontroller may take corrective action, such as sending a signal to stop a take-off or sending a signal to hold the propeller blade in the proper attitude. The method 600 may then include having the tip propellers retain lateral control of the UAV during take-off, while the inboard propellers are held in the proper attitude (step 610). The tip propellers may provide the thrust needed for take-off of the UAV while the inboard propellers are held in place to prevent the inboard propellers from striking the ground during take-off. The method 600 may then include the tip propellers continuing to rotate while the microcontroller starts rotation of the inboard propellers as the UAV ascends from the take-off site (step 608). In some embodiments, the thrust generated by the tip propellers may be reduced as the inboard propellers start rotation so as to balance the thrust generated by the sum of all of the tip propellers and inboard propellers.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
at least one microcontroller in communication with at least one first engine and at least one second engine, wherein the at least one microcontroller is configured to:
determine an angular position of at least one inboard propeller attached to the at least one first engine;
send a first signal to the at least one first engine to halt rotation of the at least one inboard propeller such that the at least one inboard propeller is held in an attitude that provides for clearance of a propeller blade to the ground upon landing; and
send a second signal to the at least one second engine to adjust rotation of at least one tip propeller attached to the at least one second engine while the at least one inboard propeller is held in the attitude that provides for clearance of the propeller blade to the ground;
wherein the at least one inboard propeller would strike the ground during rotation of the at least one inboard propeller upon landing; and
wherein the at least one second engine is configured to operate independently from the at least one first engine according to the second signal.

2. The system of claim 1, further comprising:
a position sensor in communication with the microcontroller, wherein the position sensor detects a position of the at least one inboard propeller, and wherein the position sensor is a Hall-Effect rotary position sensor.

3. The system of claim 1, further comprising:
an unmanned aerial vehicle (UAV); and
one or more inner wing panels of the UAV;
wherein the least one inboard propeller is attached to the at least one first engine disposed on the one or more inner wing panels.

4. The system of claim 3, wherein the UAV is a high altitude long endurance aircraft.

5. The system of claim 3, further comprising a solar array covering at least a portion of the one or more inner wing panels.

6. The system of claim 3, wherein the at least one microcontroller is further configured to:
determine an altitude of the UAV;
send the signal to halt rotation of the at least one inboard propeller if the determined altitude is below a threshold altitude; and
send a signal to adjust rotation of the at least one tip propeller while the at least one inboard propeller is held in the attitude that provides for clearance of the propeller blade to the ground.

7. The system of claim 3, wherein the at least one microcontroller is further configured to:
determine an altitude of the UAV; and
send a signal to start rotation of the at least one inboard propeller if the determined altitude is above a threshold altitude.

8. The system of claim 3, further comprising:
one or more outer wing panels of the UAV, wherein the one or more outer wing panels are disposed on either side of the one or more inner wing panels, and wherein the one or more outer wing panels are disposed at an upward angle to a plane formed by the one or more inner wing panels.

9. The system of claim 8, further comprising:
at least one tip propeller attached to at least one second engine disposed on the one or more outer wing panels.

10. The system of claim 9, further comprising:
one or more landing pods of the UAV, wherein the one or more landing pods are attached to the one or more inner wing panels of the UAV to assist in landing of the UAV, wherein a distance from a center of a propeller hub to a tip of the at least one inboard propeller is greater than a height of the one or more landing pods, and wherein the at least one tip propeller is identical to the at least one inboard propeller, and wherein the at least one tip propeller can freely rotate when the UAV is on the ground.

11. A method comprising:
determining, by at least one microcontroller in communication with at least one first engine and at least one second engine, an angular position of at least one inboard propeller connected to the at least one engine;
sending, by the at least one microcontroller, a first signal to the at least one first engine to halt rotation of the at least one inboard propeller such that the at least one inboard propeller is held in an attitude that provides for clearance of a propeller blade to a ground upon landing; and sending, by the at least one microcontroller, a second signal to the at least one second engine to adjust rotation of at least one tip propeller attached to the at least one second engine while the at least one inboard propeller is held in the attitude that provides for clearance of the propeller blade to the ground;

wherein the at least one inboard propeller would strike the ground during rotation of the at least one inboard propeller upon landing; and wherein the at least one second engine is configured to operate independently from the at least one first engine according to the second signal.

12. The method of claim 11, wherein the at least one first engine is on an unmanned aerial vehicle (UAV), and wherein the at least one inboard propeller is disposed on one or more inner wing panels of the UAV.

13. The method of claim 12, further comprising:
determining, by the at least one microcontroller, an altitude of the UAV.

14. The method of claim 13, wherein the signal to halt rotation of the at least one inboard propeller is sent if the determined altitude is below a threshold altitude.

15. The method of claim 13, wherein the at least one tip propeller is disposed on one or more outer wing panels, wherein the at least one tip propeller is identical to the at least one inboard propeller, and wherein the at least one tip propeller can freely rotate when the UAV is on the ground.

16. A system comprising:
at least one microcontroller in communication with at least one first engine and at least one second engine, wherein at least one inboard propeller is attached to the at least one first engine, wherein at least one tip propeller is attached to the at least one second engine, and wherein the at least one microcontroller is configured to:
determine an angular position of the at least one inboard propeller;
send a first signal to the at least one inboard propeller such that the at least one inboard propeller is held in an attitude that provides for clearance of a propeller blade to a surface;
send a second signal to the at least one tip propeller to adjust rotation of at least one tip propeller while the at least one inboard propeller is held in the attitude that provides for clearance of the propeller blade to the ground;
wherein at least a portion of the at least one inboard propeller would contact the surface during rotation of the at least one inboard propeller; and
wherein the at least one second engine is configured to operate independently from the at least one first engine according to the second signal.

17. The system of claim 16, further comprising: an unmanned aerial vehicle (UAV), wherein the UAV further comprises at least one tip propeller attached to the at least one second engine of the UAV, wherein the at least one tip propeller can rotate freely without contacting the surface during rotation of the at least one tip propeller when the UAV is located on the surface.

18. The system of claim 17, wherein the at least one microcontroller is further configured to:
send a signal to the at least one tip propeller to adjust a thrust to guide the UAV in for landing while the at least one inboard propeller is held in the attitude that provides for clearance of the propeller blade to the surface, wherein the at least one tip propeller retains lateral control of the UAV during landing.

19. The system of claim 18, wherein the at least one microcontroller is further configured to:
send a signal to the at least one tip propeller to adjust a thrust to guide the UAV for take-off while the at least one inboard propeller is in the attitude that provides for clearance of the propeller blade to the surface, wherein the at least one tip propeller retains lateral control of the UAV during take-off; and
send a signal to the at least one inboard propeller after take-off such that the at least one inboard propeller starts rotation.

20. The system of claim 18, further comprising:
one or more landing pods to assist in the safe landing of the UAV at the surface, wherein a distance from a center of a propeller hub to a tip of the at least one inboard propeller is greater than a height of the one or more landing pods, and wherein the distance from the center of the propeller hub to the tip of the at least one tip propeller is greater than or equal to a height from the center of the propeller hub of the at least one tip propeller to a bottom of the one or more landing pods;
one or more inner wing panels of the UAV, wherein the at least one inboard propeller is attached to the one or more inner wing panels;
one or more outer wing panels of the UAV, wherein the at least one tip propeller is attached to the one or more outer wing panels, wherein the one or more outer wing panels are disposed on either side of the one or more inner wing panels, and wherein the one or more outer wing panels are disposed at an upward angle to a plane formed by the one or more inner wing panels; and
a position sensor in communication with the microcontroller, wherein the position sensor detects a position of the at least one inboard propeller.

* * * * *